(12) United States Patent
Wang et al.

(10) Patent No.: US 12,019,324 B2
(45) Date of Patent: Jun. 25, 2024

(54) ELECTRONIC DEVICE

(71) Applicant: VIVO MOBILE COMMUNICATION CO., LTD., Dongguan (CN)

(72) Inventors: Yijin Wang, Dongguan (CN); Xianjing Jian, Dongguan (CN); Zhimin Zhu, Dongguan (CN); Rongjie Ma, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/989,684

(22) Filed: Nov. 18, 2022

(65) Prior Publication Data

US 2023/0084289 A1 Mar. 16, 2023

Related U.S. Application Data

(63) Continuation of application No. PCT/CN2021/094332, filed on May 18, 2021.

(30) Foreign Application Priority Data

May 20, 2020 (CN) .......................... 202010429025.9

(51) Int. Cl.
*G02F 1/1333* (2006.01)
*G02F 1/1343* (2006.01)
(Continued)

(52) U.S. Cl.
CPC ...... *G02F 1/13338* (2013.01); *G02F 1/13439* (2013.01); *G06F 3/0412* (2013.01);
(Continued)

(58) Field of Classification Search
CPC ..................................................... G02F 1/1343
See application file for complete search history.

(56) References Cited

U.S. PATENT DOCUMENTS

2010/0321325 A1    12/2010   Springer et al.
2011/0298670 A1    12/2011   Jung et al.
(Continued)

FOREIGN PATENT DOCUMENTS

CN    101180765 A    5/2008
CN    106104915 A    11/2016
(Continued)

OTHER PUBLICATIONS

International Search Report issued in corresponding International Application No. PCT/CN2021/094332, mailed Jul. 14, 2021, 4 pages.
(Continued)

*Primary Examiner* — Sang V Nguyen
(74) *Attorney, Agent, or Firm* — IPX PLLC

(57) ABSTRACT

An electronic device includes a display unit, where the display unit includes a touch layer and a liquid crystal panel that are stacked, the touch layer is located on an outer side of the liquid crystal panel, and the touch layer includes an ITO wiring region, where the ITO wiring region includes a first region and a second region, antenna units are disposed in the first region, and ITO wirings are disposed in the second region, and the antenna units and the ITO wirings are insulated.

11 Claims, 5 Drawing Sheets

(51) Int. Cl.
  *G06F 3/041* (2006.01)
  *H01Q 1/22* (2006.01)
  *H01Q 1/38* (2006.01)
  *H01Q 21/08* (2006.01)

(52) U.S. Cl.
  CPC ........... *G06F 3/04164* (2019.05); *H01Q 1/22* (2013.01); *H01Q 1/38* (2013.01); *H01Q 21/08* (2013.01)

(56) References Cited

U.S. PATENT DOCUMENTS

| | | | | |
|---|---|---|---|---|
| 2012/0265458 | A1* | 10/2012 | Agapiou | G01R 31/14 |
| | | | | 702/59 |
| 2015/0155614 | A1* | 6/2015 | Youn | H04M 1/0202 |
| | | | | 343/702 |
| 2015/0193080 | A1* | 7/2015 | Takahashi | H01Q 1/44 |
| | | | | 345/174 |
| 2015/0255856 | A1* | 9/2015 | Hong | H01Q 21/061 |
| | | | | 343/702 |
| 2016/0231844 | A1* | 8/2016 | Lee | G02B 5/3058 |
| 2016/0328057 | A1* | 11/2016 | Chai | G06F 3/0412 |
| 2017/0139520 | A1* | 5/2017 | Yeh | H01Q 9/30 |
| 2018/0205156 | A1* | 7/2018 | Li | G02F 1/133382 |
| 2019/0220123 | A1 | 7/2019 | Kanaya | |
| 2020/0227819 | A1* | 7/2020 | Oh | H04M 1/0266 |

FOREIGN PATENT DOCUMENTS

| | | |
|---|---|---|
| CN | 106125970 A | 11/2016 |
| CN | 108140941 A | 6/2018 |
| CN | 111007953 A | 4/2020 |
| CN | 111564692 A | 8/2020 |
| KR | 101973742 B1 | 4/2019 |
| KR | 102099830 B1 | 4/2020 |
| WO | 2019238182 A1 | 12/2019 |

OTHER PUBLICATIONS

First Office Action issued in related Chinese Application No. 202010429025.9, mailed Dec. 21, 2020, 7 pages.
Extended European Search Report issued in related European Application No. 21808027.3, mailed Oct. 4, 2023, 8 pages.

* cited by examiner

ELECTRONIC DEVICE

CROSS-REFERENCE TO RELATED APPLICATIONS

This application is a continuation of International Application No. PCT/CN2021/094332, filed on May 18, 2021, which claims priority to Chinese Patent Application No. 202010429025.9, filed on May 20, 2020. The entire contents of each of the above-identified applications are expressly incorporated herein by reference.

TECHNICAL FIELD

This application relates to the technical field of communication devices, and in particular to an electronic device.

BACKGROUND

Compared with a previous generation technology, the $5^{th}$ Generation (5G) mobile communication technology can provide a higher communication speed, lower latency, and more simultaneous connections. Because a very wide communication bandwidth is provided in the 5G mobile communication technology, a millimeter wave communication technology with a frequency band above 20 GHz is one of key technologies in the 5G technology. Many countries and regions in the world have designated a millimeter wave frequency band as a frequency band used in the 5G technology. Therefore, in the future, there will be an increasing number of electronic products, especially mobile communication terminals such as mobile phones, equipped with millimeter wave antenna modules.

In the related art, a technology and process of an Antenna In Package (AIP) are usually provided, that is, an array antenna, a Radio Frequency Integrated Circuit (RFIC), and a Power Management Integrated Circuit (PMIC) are integrated in one module. While implementing this application, it is found that at least the following problem exists in the related art: since an antenna is provided through an AIP unit, a volume of an electronic device equipped with the unit is relatively large.

SUMMARY

Embodiments of this application provide an electronic device.

According to a first aspect, an embodiment of this application provides an electronic device, including a display unit, where the display unit includes a touch layer and a liquid crystal panel that are stacked, the touch layer is located on an outer side of the liquid crystal panel, and the touch layer includes an ITO wiring region, where the ITO wiring region includes a first region and a second region, antenna units are disposed in the first region, and ITO wirings are disposed in the second region, and the antenna units and the ITO wirings are insulated.

In some embodiments of this application, when a first region and a second region are disposed in the ITO wiring region included in the touch layer, antenna units are disposed in the first region, and ITO wirings are disposed in the second region, and the antenna units and the ITO wirings are insulated. The antenna units are disposed by using a multi-layer structure of the display unit.

BRIEF DESCRIPTION OF DRAWINGS

The following describes the accompanying drawings required in the embodiments of this application. Apparently, the accompanying drawings in the following descriptions show merely some embodiments of this application, and a person of ordinary skill in the art may still derive other drawings from these accompanying drawings without creative efforts.

DETAILED DESCRIPTION

Figure 1:
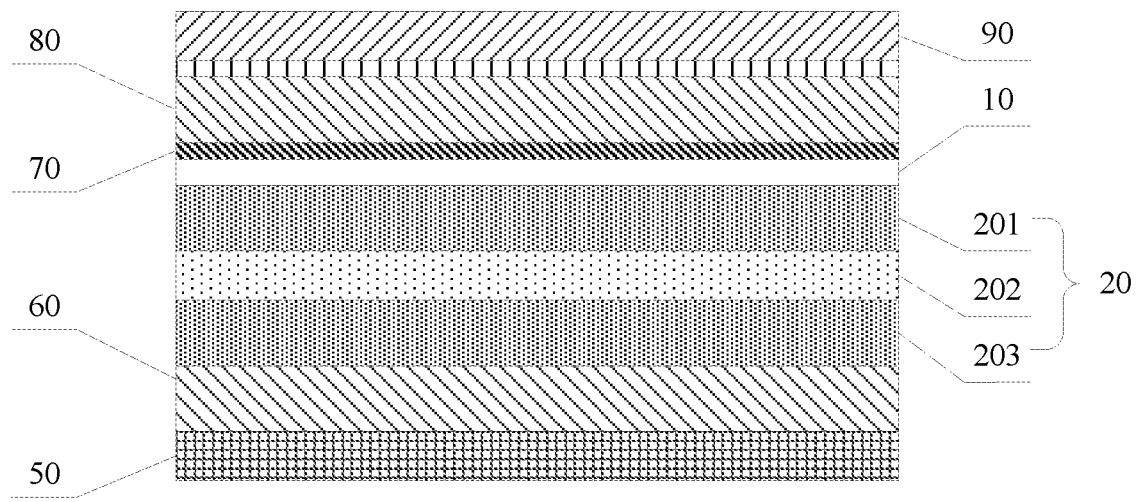
FIG. 1 is a cross-sectional structural diagram of a display unit according to an embodiment of this application.

The following describes the embodiments of this application with reference to the accompanying drawings of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, the technical terms or scientific terms used in this application shall have the general meanings understood by a person of ordinary skill in the field of this application. The "first," "second," and similar words used in this application are only intended to distinguish different components, rather than to indicate any order, quantity, or importance. Similarly, similar words such as "one piece" or "one" indicates the presence of at least one, rather than indicating a quantity limit. Similar words such as "connect" or "connection" are not limited to physical or mechanical connections, but may include electrical connections, no matter it is direct or indirect. "Upper," "lower," "left," "right," and the like are only intended to indicate a relative positional relationship. When absolute positions of the described object change, the relative positional relationship changes accordingly as well.

Referring to FIG. 1 to FIG. 5, embodiments of this application provide an electronic device, including a display unit 100. The display unit 100 includes a touch layer 10 and a liquid crystal panel 20 that are stacked, where the touch layer 10 is located on an outer side of the liquid crystal panel 20, and the touch layer 10 includes an Indium Tin Oxide (ITO) wiring region. The ITO wiring region includes a first region 101 and a second region 102, where antenna units 30 are disposed in the first region 101, and ITO wirings 40 are disposed in the second region 102, and the antenna units 30 and the ITO wirings 40 are insulated.

Figure 2:
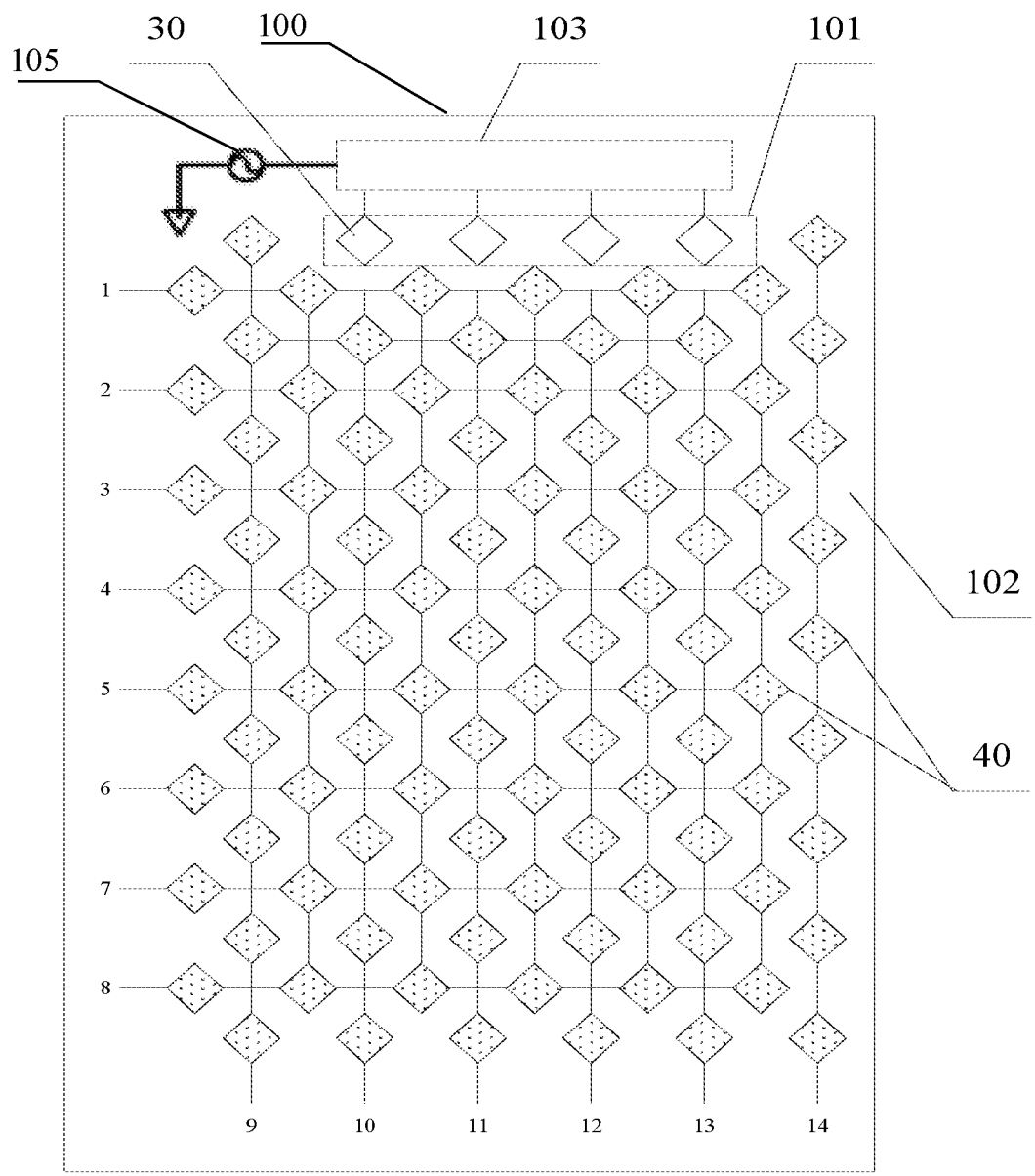
FIG. 2 is a first structural diagram of a touch layer in the display unit according to an embodiment of this application.

In some embodiments of this application, there may be one or more antenna units 30. In the following embodiments, for example, the number of the antenna units 30 is N, and N is an integer greater than 1. As shown in FIG. 2, in some embodiments, there may be four antenna units.

Further, to improve a gain of a wireless signal transmitted by the antenna unit 30, in some embodiments, the N antenna units 30 are distributed in an array. In some implementations, the N antenna units 30 may be distributed in a linear array, that is, the N antenna units 30 may be distributed in a straight line and arranged at uniform intervals, where a distance between the intervals may be set according to an operating frequency.

It should be understood that the antenna units 30 may be made of ITO wirings or nano-silver wires with certain light transmittance and conductivity. The outer side of the liquid crystal panel 20 can be understood as a side of the liquid crystal panel 20 used for display, that is, a light-emitting side of the liquid crystal panel 20.

In some embodiments, the antenna units 30 being made of ITO wirings can be understood that the antenna units 30 are partially made of ITO wirings. As shown in FIG. 2, in this embodiment, the ITO wirings include rhombus blocks as shown in the figure, where a rhombus block a, a rhombus block b, a rhombus block c, and a rhombus block d are four antenna units.

In some implementations, the antenna units 30 may further be designed in other shapes, which is not further limited herein.

In some implementations, the liquid crystal panel 20 includes an upper glass 201, a liquid crystal layer 202, and a lower glass 203 which are stacked in sequence. As shown in FIG. 1, the display unit 100 further includes a backlight source 50, a lower polarizer 60, a Poly Ethylene Terephthalate (PET) layer 70, an upper polarizer 80, and a protective glass 90. The backlight source 50, the lower polarizer 60, the lower glass 203, the liquid crystal layer 202, the upper glass 201, the touch layer 10, the PET layer 70, the upper polarizer 80, and the protective glass 90 are stacked in sequence.

In some embodiments of this application, when the first region and the second region are disposed in the touch layer including the ITO wiring region, the antenna units 30 are disposed in the first region, and the ITO wirings are disposed in the second region. The antenna units are disposed by using a multi-layer structure of the display unit 100. This way, it is not necessary to dispose an Aip unit separately in a device body, so that a volume of an electronic device can be reduced, which is beneficial to miniaturization design of the electronic device. In addition, since the antenna units will be disposed on an outer side of the liquid crystal panel, interference of the liquid crystal panel to antennas can be effectively prevented, and the performance of the antennas can be improved.

Figure 3:
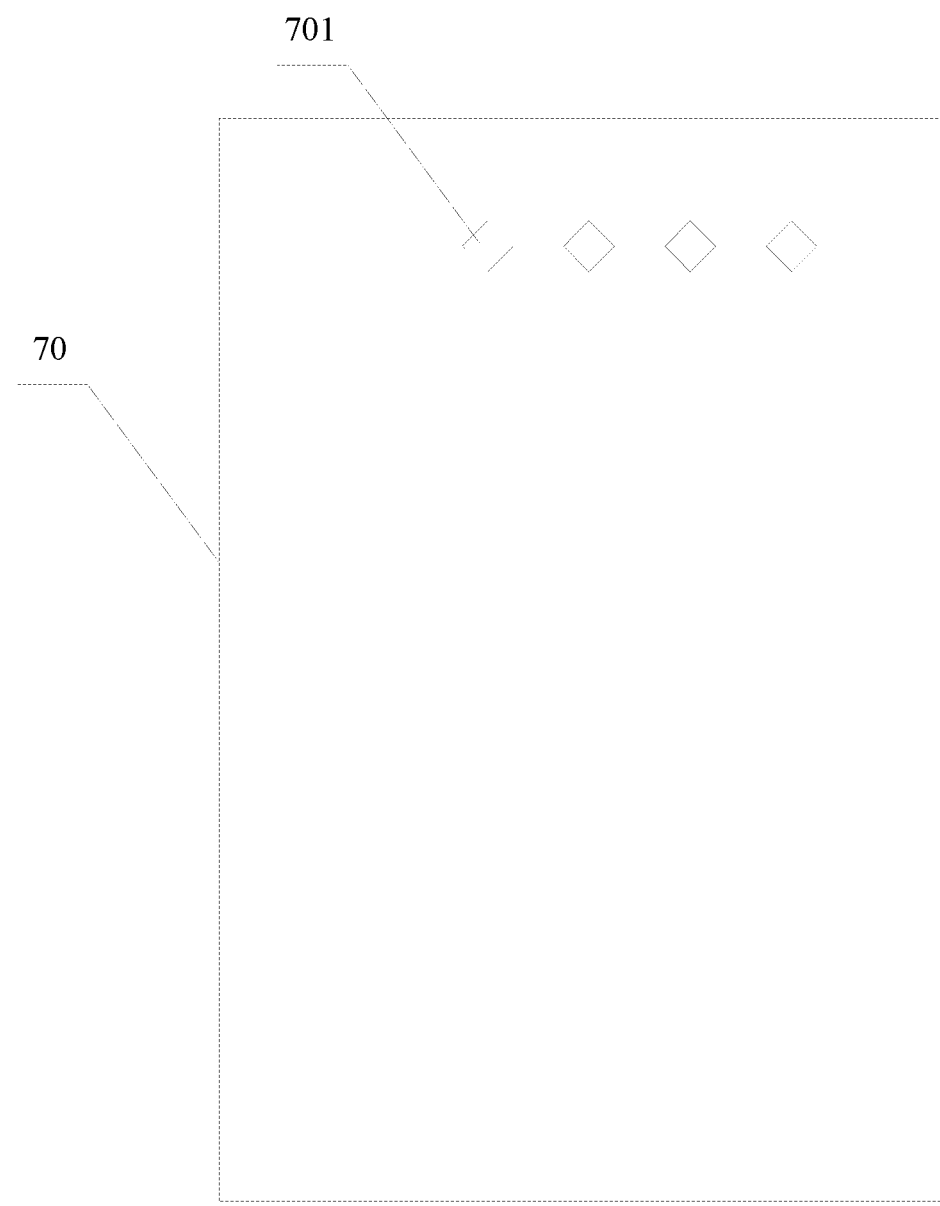
FIG. 3 is a structural diagram of a PET layer in the display unit according to an embodiment of this application.

Further, as shown in FIG. 3, the PET layer 70 is further disposed on a side of the touch layer 10 away from the liquid crystal panel 20, and coupling sheets 701 in a one to one correspondence with the antenna units 30 are disposed at positions that are on the PET layer 70 and that correspond to the antenna units 30.

In some embodiments, the PET layer 70 is located above the antenna units 30, that is, the coupling sheets 701 are located right above the antenna units 30. A size of the coupling sheets 701 is the same as a size of the antenna units 30. That is, orthographic projections of the coupling sheets 701 on the touch layer 10 coincide with the corresponding antenna units 30. Because the coupling sheets 701 are disposed, an impedance bandwidth of the antenna units 30 can be increased, and the coupling sheets 701 has a certain traction effect on current distribution of the antenna units 30, thereby improving directivity of wireless signal radiation and increasing a gain of a wireless signal.

The electronic device further includes a signal source 105, the touch layer 10 further includes a bonding region 103, and the antenna units 30 are connected to the signal source 105 through the bonding region 103.

In some embodiments, the antenna units can be connected to a Flexible Printed Circuit (FPC) carrying the signal source 105 and a screen display IC through an Anisotropic Conductive Film (ACF) bonding process. A substrate of the FPC may be a low-loss dielectric material, such as a Liquid Crystal Polymer (LCP) and a Modified Polylmide (MPI).

In some embodiments, the foregoing signal source 105 is a millimeter wave signal source. That is, a millimeter wave signal can be transmitted through the foregoing antenna units 30.

Further, to prevent a position detection function from being lost in the first region, in this embodiment, the electronic device further includes a detection element, and the detection element is connected to the antenna units 30 for detecting strength of a signal received by the antenna units 30.

In some embodiments, the detection element may be a radar detection chip, a capacitive sensor, or the like. When the detection element detects that a foreign object is approaching, an instruction may be given to control the electronic device to perform a corresponding operation.

It should be understood that, in some embodiments, the foregoing N antenna units 30 include a transmit antenna unit and a receive antenna unit. The transmit antenna unit transmits a wireless signal, and it can be determined that whether a user's finger is approaching a screen according to whether the receive antenna unit receives a signal reflected by the wireless signal or not. In this case, a position touched by the user can be determined according to a position of the receive antenna unit that receives a signal reflected by the wireless signal.

Figure 4:
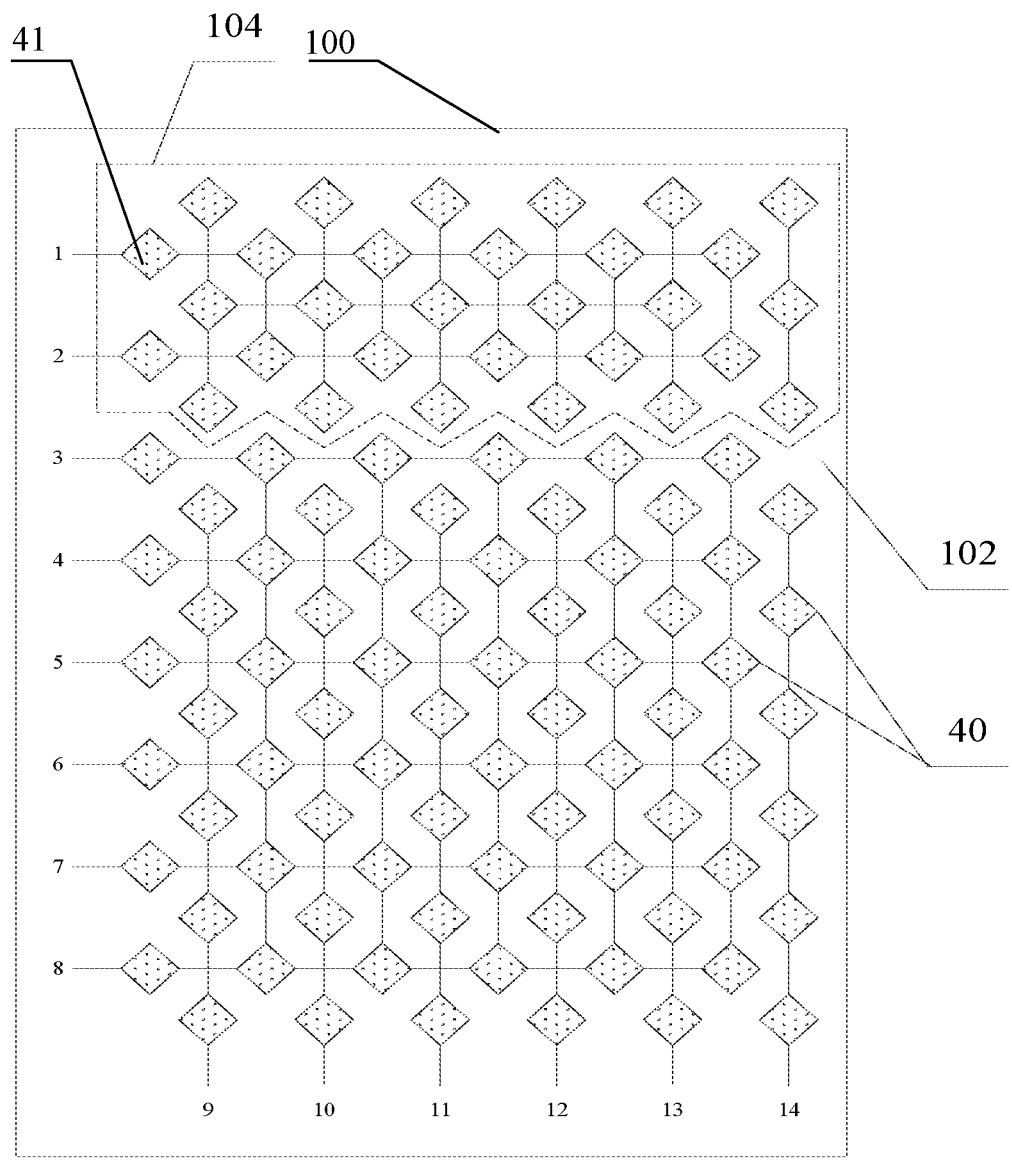
FIG. 4 is a second structural diagram of the touch layer in the display unit according to an embodiment of this application.

Further, as shown in FIG. 4, the ITO wiring region further includes a third region 104. An antenna radiator 41 formed by ITO wirings are disposed in the third region 104. ITO wirings in the third region 104, ITO wirings in the second region 102, and the antenna units 30 are insulated, and an area of the antenna radiator 41 is larger than that of the antenna units 30.

In some embodiments, the antenna radiator 41 and the antenna units 30 work in different frequency bands. Antennas formed by the antenna radiator 41 may include communication antennas of different communication frequency bands, for example, may include a Long Term Evolution (LTE) antenna, that is, an LTE antenna formed by some antenna radiators 41 with an operating frequency less than 3 GHz.

Figure 5:
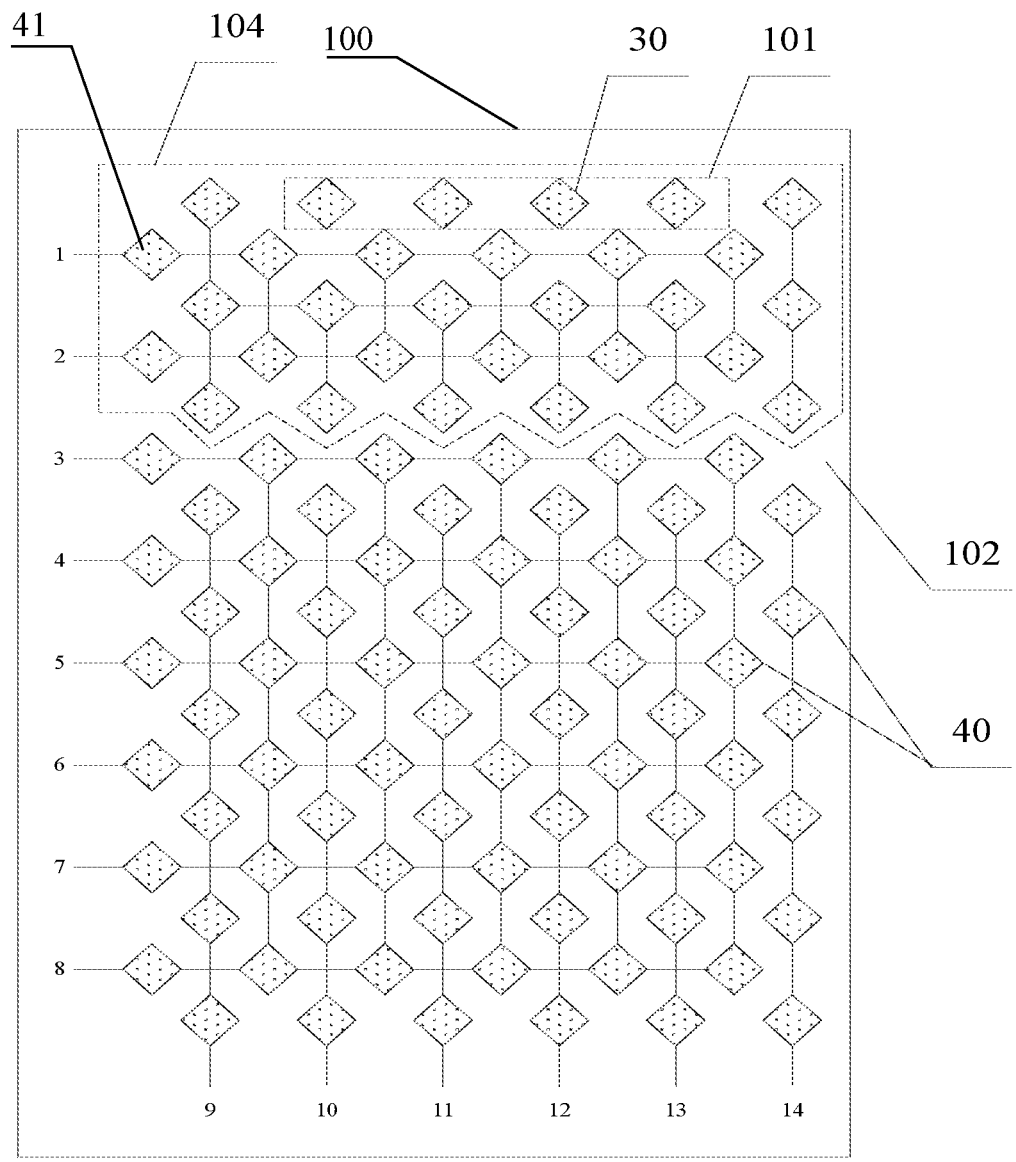
FIG. 5 is a third structural diagram of the touch layer in the display unit according to an embodiment of this application.

The display unit 100 may have a planar structure, that is, the antenna radiator 41 and the antenna units 30 are disposed in a same plane. As shown in FIG. 5, when the antenna radiator 41 and the antenna units 30 are disposed in the same plane, the first region 101 is located in the third region 104. In some embodiments, if the antenna radiator 41 forms a plurality of antennas of different frequency bands, the first region may be located in a region corresponding to the LTE antenna. In other words, an ITO wiring where a millimeter-wave antenna region is located is disposed inside a region where the LTE antenna is located.

In some embodiments, the display unit 100 includes a first part and a second part, the first part and the second part are disposed opposite to each other, the antenna units are located in the first part, and the antenna radiator 41 is located in the second part.

In some embodiments, the first part and the second part may form an integrated structure, that is, the foregoing display unit 100 may be disposed in a ring shape. In some embodiments, the first part and the second part may also be separate structures, that is, include two display units 100 that are disposed opposite to each other.

In some embodiments, when the display unit 100 is disposed in a ring shape, the electronic device can be understood as an electronic device with a surrounding screen, that is, front, back, and side surfaces of the electronic device are all display surfaces. A first side can be understood as a front surface or back surface, and a second side can be understood as the back surface or front surface.

It should be noted that the antenna formed by the antenna radiator 41 is a non-millimeter-wave antenna, and can be all connected to a touch Integrated Circuit (IC), as long as mutual interference caused by sharing of an ITO wiring between the touch IC and a radio frequency IC is prevented.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An electronic device, comprising:
a display unit, wherein the display unit comprises a touch layer and a liquid crystal panel that are stacked, the touch layer is located on an outer side of the liquid crystal panel, and the touch layer comprises an Indium Tin Oxide (ITO) wiring region, wherein the ITO wiring region comprises a first region and a second region;
antenna units disposed in the first region; and
ITO wirings disposed in the second region, and the antenna units and the ITO wirings are insulated, wherein the antenna units are at least partially made of same structure as the ITO wirings,
wherein a Poly Ethylene Terephthalate (PET) layer is further disposed on a side of the touch layer away from the liquid crystal panel, and coupling sheets in a one to one correspondence with the antenna units are disposed at positions that are on the PET layer and that correspond to the antenna units.

2. The electronic device according to claim 1, wherein the number of the antenna units is N, and N is an integer greater than 1.

3. The electronic device according to claim 2, wherein the N antenna units are distributed in an array.

4. The electronic device according to claim 1, further comprising a signal source, wherein the touch layer further comprises a bonding region, and the antenna units are connected to the signal source through the bonding region.

5. The electronic device according to claim 4, wherein the signal source is a millimeter wave signal source.

6. The electronic device according to claim 1, wherein the ITO wiring region further comprises a third region,
wherein antenna radiators are disposed in the third region,
wherein the antenna radiators are at least partially made of same structure as the ITO wirings,
wherein the ITO wirings in the third region, the ITO wirings in the second region, and the antenna units are insulated, and
wherein an area of the antenna radiators is larger than that of the antenna units.

7. The electronic device according to claim 6, wherein the first region is located in the third region.

8. The electronic device according to claim 6, wherein the antenna radiators and antenna units are configured to work on different frequency bands.

9. The electronic device according to claim 1, wherein the coupling sheets are configured to increase an impedance bandwidth of the antenna units.

10. The electronic device according to claim 1, wherein the coupling sheets have a traction effect on current distribution of the antenna units.

11. The electronic device according to claim 1, wherein orthographic projections of the coupling sheets on the touch layer coincide with the corresponding antenna units.

* * * * *